US010339287B2

(12) United States Patent
Chowdhury et al.

(10) Patent No.: US 10,339,287 B2
(45) Date of Patent: Jul. 2, 2019

(54) SYSTEMS AND METHODS FOR AUTHENTICATING DRIVERS BASED ON GPS DATA

(71) Applicant: Tata Consultancy Services Limited, Mumbai (IN)

(72) Inventors: Arijit Chowdhury, Kolkata (IN); Avik Ghose, Kolkata (IN); Tapas Chakravarty, Kolkatta (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/913,515

(22) Filed: Mar. 6, 2018

(65) Prior Publication Data

US 2018/0373855 A1   Dec. 27, 2018

(30) Foreign Application Priority Data

Jun. 27, 2017   (IN) .............................. 201721022438

(51) Int. Cl.
| | |
|---|---|
| *G05D 1/00* | (2006.01) |
| *G07C 5/08* | (2006.01) |
| *B60W 40/09* | (2012.01) |
| *B60W 40/10* | (2012.01) |
| *G06F 21/31* | (2013.01) |
| *G06F 16/2457* | (2019.01) |

(52) U.S. Cl.
CPC .......... *G06F 21/316* (2013.01); *B60W 40/09* (2013.01); *B60W 40/10* (2013.01); *G06F 16/24578* (2019.01); *G07C 5/08* (2013.01)

(58) Field of Classification Search
CPC .......... G05D 1/00; B60R 25/33; G05B 19/00; G01C 21/26; G07C 5/08; B60W 10/18

USPC ............. 340/5.81, 5.8, 5.2, 5.72; 701/1, 25; 477/159, 183

See application file for complete search history.

(56) References Cited

U.S. PATENT DOCUMENTS

| | | | |
|---|---|---|---|
| 6,690,260 B1 | 2/2004 | Ashihara | |
| 8,744,769 B1 * | 6/2014 | Bell ................. | G08G 1/096838 |
| | | | 701/411 |

(Continued)

FOREIGN PATENT DOCUMENTS

WO   WO 2008/001125 A1   1/2008

*Primary Examiner* — Nam V Nguyen
(74) *Attorney, Agent, or Firm* — Finnegan, Henderson, Farabow, Garrett & Dunner LLP

(57) ABSTRACT

Currently automobiles use embedded sensors and computational powers for performance optimization. For better performance and maintenance knowing driver and driving style is important. It is known that driver identification can be achieved using dedicated sensors. Since these are external sensors they add to cost and also deployment of many sensors increases operational and maintenance overhead. Embodiments of the present disclosure obtain GPS data including trip information pertaining to a vehicle being driven by a driver and features are extracted from trip information which are ranked by comparing these features with features associated with trip information of other drivers to selectively identify and obtain ranked features. Value of each ranked feature is compared with value of corresponding feature pertaining to driving patterns and an abnormality score for each relevant feature is generated and the driver is authenticated based on the abnormality score.

18 Claims, 2 Drawing Sheets

(56) References Cited

U.S. PATENT DOCUMENTS

| | | |
|---|---|---|
| 9,493,149 B2 | 11/2016 | Phelan |
| 9,615,213 B2 | 4/2017 | Tibbitts et al. |
| 9,830,665 B1 * | 11/2017 | Healy .................... G06Q 40/08 |
| 9,855,919 B2 * | 1/2018 | Basir ....................... B60R 25/33 |
| 9,963,106 B1 * | 5/2018 | Ricci ................... B60R 25/2018 |
| 2016/0109243 A1 * | 4/2016 | Tseng ................. G01C 21/3484 |
| | | 701/408 |
| 2018/0274934 A1 * | 9/2018 | Agrawal .............. B29C 61/003 |

* cited by examiner

SYSTEMS AND METHODS FOR AUTHENTICATING DRIVERS BASED ON GPS DATA

PRIORITY CLAIM

This U.S. patent application claims priority under 35 U.S.C. § 119 to: India Application No. 201721022438, filed on Jun. 27, 2017. The entire contents of the aforementioned application are incorporated herein by reference.

TECHNICAL FIELD

The disclosure herein generally relate to authentication systems, and, more particularly, to systems and methods for authenticating drivers based on Global Positioning System (GPS) data.

BACKGROUND

Currently automobiles use embedded sensors and computational powers for performance optimization. For better performance and maintenance knowing driver and his/her natural tendency i.e., unique driving style is important. For advanced driver assistance system identifying the driver is crucial. It is known that driver identification can be achieved to a good extent using few numbers of dedicated sensors. Such approach uses machine learning on data collected from a plurality of sensors. Since these are external sensors they add to cost and also deployment of many sensors increases operational and maintenance overhead. Thus such scheme has a huge logistics cost associated with it, which in turn limits the rapid and large scale deployment. Also installing and communicating with sensors requires additional overheads.

SUMMARY

Embodiments of the present disclosure present technological improvements as solutions to one or more of the above-mentioned technical problems recognized by the inventors in conventional systems. For example, in one aspect, a processor implemented method for authenticating drivers is provided. The method comprising: obtaining, from a Global Positioning System (GPS), GPS data comprising trip information pertaining to a vehicle being driven by a driver; extracting one or more features from the trip information, the step of extracting the one or more features from the trip information comprises: obtaining a primary data from the trip information, and deriving a secondary data from the primary data; and extracting the one or more features from the primary data and the second data; ranking, using a ranking technique, the one or more features from the trip information by performing a first comparison of the one or more features with a plurality of features associated with a plurality of trip information pertaining to other drivers to selectively identify and obtain one or more ranked features, wherein the one or more ranked features are selectively identified based on the trip information and historical data pertaining to one or more driving patterns of the driver stored in a database; performing a second comparison of (i) a value of each ranked feature from the one or more ranked features and (ii) a value of corresponding feature pertaining to the one or more driving patterns stored in the database; generating an abnormality score for each of the relevant feature based on the second comparison; and authenticating the driver based on the abnormality score.

In an embodiment, the step of authenticating the driver based on the abnormality score comprises: performing a third comparison of the abnormality score with a first pre-defined threshold; and authenticating the driver based the third comparison. In an embodiment, when the abnormality score does not match the first pre-defined threshold, the method comprises: generating an average abnormality score based on the abnormality score for each of the relevant feature; and authenticating the driver based on the average abnormality score.

In an embodiment, the step of authenticating the driver based on the average abnormality score comprises performing a fourth comparison of the average abnormality score and a second pre-defined threshold; and authenticating the driver based on the fourth comparison.

In an embodiment, the method may further comprise upon the driver being authenticated based on the abnormality score or the average abnormality score, updating a driver profile for the driver in the database.

In another aspect, a system for authenticating drivers is provided. The system comprising: a memory storing instructions, and a database comprising one or more driving patterns and one or more driver profiles; one or more communication interfaces; and one or more hardware processors coupled to the memory via the one or more communication interfaces, wherein the one or more hardware processors are configured by the instructions to: obtain, from a Global Positioning System (GPS), GPS data comprising trip information pertaining to a vehicle being driven by a driver; extract one or more features from the trip information, the one or more features are extracted from the trip information by: obtaining a primary data from the trip information, and deriving a secondary data from the primary data; and extracting the one or more features from the primary data and the second data.

The one or more hardware processors are further configured by the instructions to rank, using a ranking technique, the one or more features from the trip information by performing a first comparison of the one or more features with a plurality of features associated with a plurality of trip information pertaining to other drivers to selectively identify and obtain one or more ranked features, wherein the one or more ranked features are selectively identified based on the trip information and historical data pertaining to one or more driving patterns of the driver stored in a database, perform a second comparison of (i) a value of each relevant feature from the one or more ranked features (that are selectively identified) and (ii) a value of corresponding feature pertaining to the one or more driving patterns stored in the database; generate an abnormality score for each of the relevant feature based on the second comparison; and authenticate the driver based on the abnormality score.

In an embodiment, the driver is authenticated based on the abnormality score by: performing a third comparison of the abnormality score with a first pre-defined threshold; and authenticating the driver based the third comparison.

In an embodiment, when the abnormality score does not match the pre-defined threshold, the one or more hardware processors are further configured by the instructions to: generate an average abnormality score based on the abnormality score for each of the relevant feature; and authenticate the driver based on the average abnormality score. In an embodiment, the driver is authenticated based on the average abnormality score by performing a fourth comparison of the average abnormality score and a second pre-defined threshold; and authenticating the driver based on the fourth comparison.

In an embodiment, upon the driver being authenticated based on the abnormality score or the average abnormality score, the one or more hardware processors are further configured by the instructions to update a driver profile of the driver in the database.

In yet another aspect, one or more non-transitory machine readable information storage mediums comprising one or more instructions is provided. The one or more instructions which when executed by one or more hardware processors cause obtaining, from a Global Positioning System (GPS), GPS data comprising trip information pertaining to a vehicle being driven by a driver; extracting one or more features from the trip information, wherein the step of extracting the one or more features from the trip information comprises: obtaining a primary data from the trip information, and deriving a secondary data from the primary data; and extracting the one or more features from the primary data and the secondary data. The instructions further cause ranking, using a ranking technique, the one or more features from the trip information by performing a first comparison of the one or more features with a plurality of features associated with a plurality of trip information pertaining to other drivers to selectively identify and obtain one or more ranked features, wherein the one or more ranked features are selectively identified based on the trip information and historical data pertaining to one or more driving patterns of the driver stored in a database; performing a second comparison of (i) a value of each ranked feature from the one or more ranked features and (ii) a value of corresponding feature pertaining to the one or more driving patterns stored in the database; generating an abnormality score for each of the relevant feature based on the second comparison; and authenticating the driver based on the abnormality score.

In an embodiment, the step of authenticating the driver based on the abnormality score comprises: performing a third comparison of the abnormality score with a first pre-defined threshold; and authenticating the driver based the third comparison. In an embodiment, when the abnormality score does not match the first pre-defined threshold, the instructions further cause generating an average abnormality score based on the abnormality score for each of the relevant feature; and authenticating the driver based on the average abnormality score.

In an embodiment, the step of authenticating the driver based on the average abnormality score comprises performing a fourth comparison of the average abnormality score and a second pre-defined threshold; and authenticating the driver based on the fourth comparison. In an embodiment, the instructions may further comprise upon the driver being authenticated based on the abnormality score or the average abnormality score, updating a driver profile for the driver in the database.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a park of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
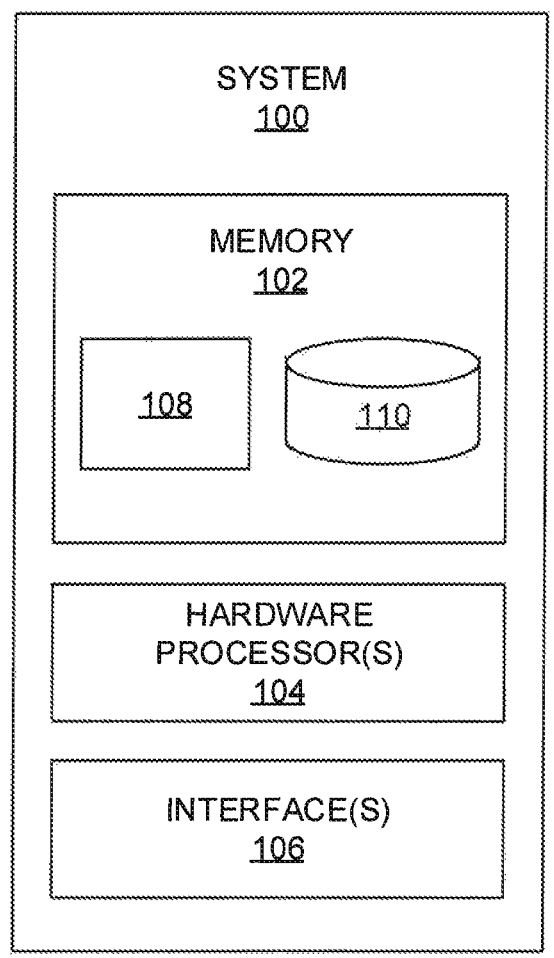
FIG. 1 illustrates an exemplary block diagram of a system for authenticating drivers based on GPS data in accordance with an embodiment of the present disclosure.
Figure 2:
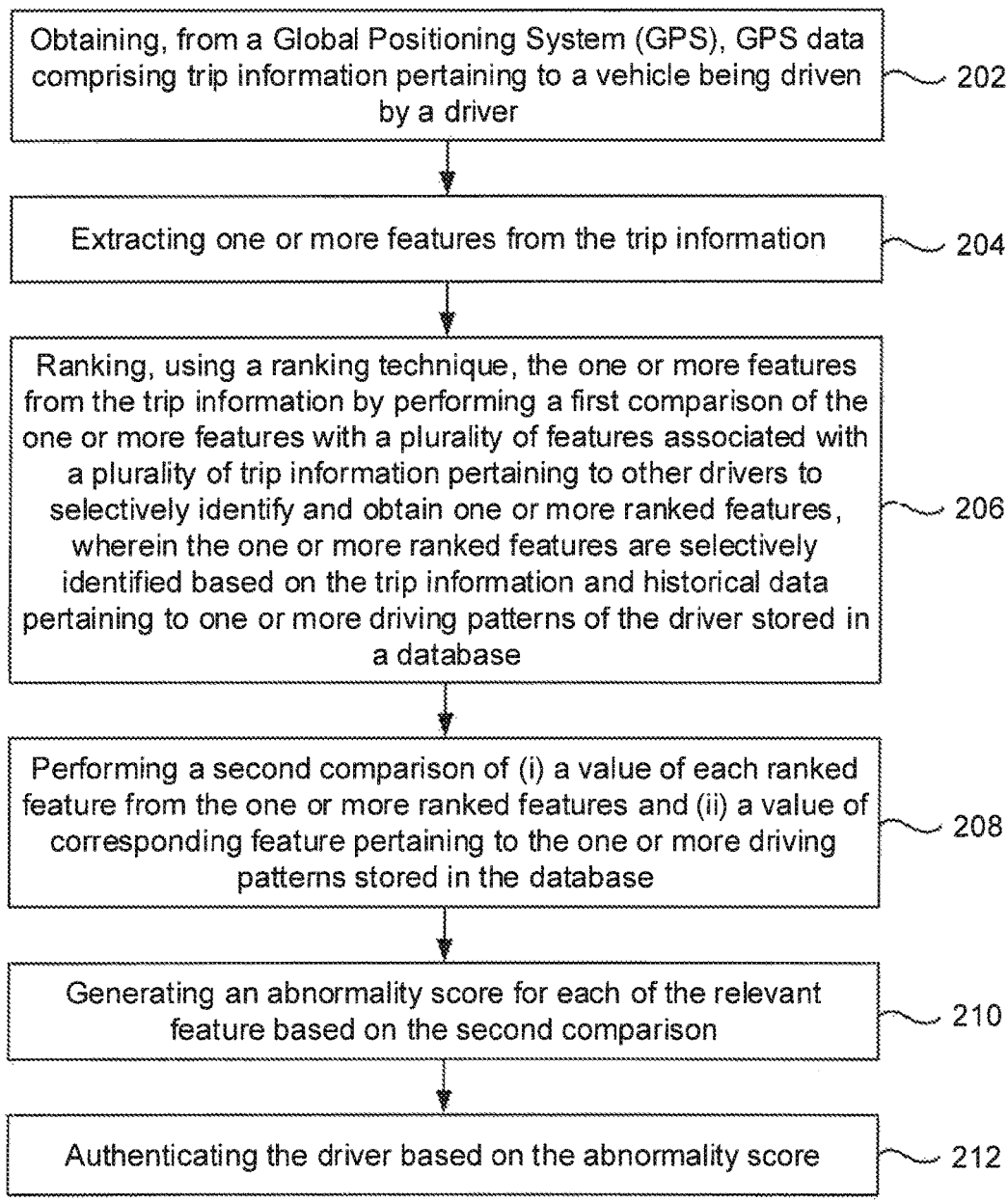
FIG. 2 illustrates an exemplary flow diagram of a method for authenticating drivers based on GPS data using the system of FIG. 1 in accordance with an embodiment of the present disclosure.

Referring now to the drawings, and more particularly to FIGS. 1 through 2, where similar reference characters denote corresponding features consistently throughout the figures, there are shown preferred embodiments and these embodiments are described in the context of the following exemplary system and/or method.

FIG. 1 illustrates an exemplary block diagram of a system 100 for authenticating drivers based on GPS data in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (110) of the system 100 can be stored in the memory 102.

FIG. 2, with reference to FIG. 1, illustrates an exemplary flow diagram of a method for authenticating drivers based on GPS data using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment of the present disclosure, at step 202, the one or more hardware processors 104 obtain, from a Global Positioning System (GPS), GPS data comprising trip information pertaining to a vehicle being driven by a driver.

In one embodiment a GPS logger (with in-built GPS receiver and computation power) works as primary sensor. In another embodiment smartphone with in-built GPS is used. This device only captures GPS data and sends the same to a central server (or the system 100) for further processing. Data is communicated via internet to the central server. Vehicle identifier $V_{ID}$ and Driver identifier $D_{ID}$ are used to tag data to the vehicle and specific driver. For example, the GPS may detect one or more vehicle start events and one or more end events and data pertaining to trip (trip information between the start event9s) and the end event(s)) is transmitted to a database 108 (stored in the memory 102). In an embodiment of the present disclosure, at step 204, the one or more hardware processors 104 extract one or more features from the trip information. In an embodiment, a primary data from the trip information is extracted, and a secondary data from the primary data. The one or more features are then extracted from the primary data and the secondary data. In an embodiment of the present disclosure, the features may be extracted from the GPS data and/or the primary data and the secondary data, using a feature extraction module stored in the one or more modules 110 residing in the memory 102.

For instance, the primary data may comprise, but is not limited to, Speed, Acceleration, Course, and the like obtained from the GPS, whereas the secondary data is derived from the primary data. For example, the derived secondary data may comprise, but it not limited to Jerk, lateral acceleration, angular speed, jerk energy. For each primary data and derived secondary data, their one or more differences are computed (e.g., a first difference, a second difference, a nth difference, etc.). This gives us all relevant parameters of journey. In an embodiment of the present disclosure, Course itself may not be a parameter, however 1st difference and 2nd difference of the course may become a parameter. Similarly, 1st difference of speed is acceleration, hence speed, acceleration, 1st difference and 2nd difference of acceleration is a parameter of journey. Now for entire journey a set of values for each parameter (i.e., a set of speed, a set of 2nd difference of lateral acceleration are obtained. Then for each of this, one or more statistics are computed.

Further for each parameter mean, median, skewness, kurtosis, standard deviation, max, min, 97.5th percentile, Q3, Q1, 2.5th percentile are computed, which become the one or more extracted features. Examples of extracted features may comprise, but are not limited to, median of speed, Q1 of 1st difference of lateral acceleration, Kurtosis of 2nd difference of jerk energy, 2.5th percentile of 2nd difference of jerk energy. #1st difference of x is del_x(n)=x (n+1)−x(n) and #2nd difference of x is the 1st difference of del_x.

In an embodiment of the present disclosure, at step 206, the one or more hardware processors 104 rank, using a ranking technique, the one or more extracted features from the trip information by performing a first comparison of the one or more features with a plurality of features associated with a plurality of trip information pertaining to other drivers to selectively identify and obtain one or more ranked features, wherein the one or more ranked features are selectively identified based on the trip information and historical data pertaining to one or more driving patterns of the driver stored in the database 108 residing in the memory 102. The one or more driving patterns stored in the database 108 are fetched for selectively identifying a set of relevant features (which are ranked and filtered from other remaining features). The selective identification of the one or more ranked features may also be based on the comparison between extracted features of the trip information, and features (or corresponding features) of trip information pertaining to other drivers and/or the historical data (comprising driving patterns of the driver to be authenticated). This selective identification of the set of relevant features (or select ranked features) may also be based on a unique driver identifier obtained from the trip information. In an embodiment of the present disclosure, the ranking technique may be implemented or executed by a ranking module stored in the one or more modules 110 residing in the memory 102 for ranking relevant features required for generating abnormality score and performing authentication of the driver thereof. The one or more features when ranked by performing the first comparison enable the system 100 to identify select relevant features from the one or more features, wherein the select relevant features (that are ranked and filtered from other features) are further used for generating abnormality score and performing authentication of the driver thereof. In other words, upon selective identification of the one or more ranked features, the selected ranked feature(s) may be referred as 'a set of relevant features' that can be used for generating abnormality score and authenticating the driver thereof.

To perform feature ranking for a specific driver (say A) all the features for A are taken till last recent journey of A versus all journey by other drivers. Now to avoid biasing few journeys from other drivers are taken so that total number of journeys by A is equal (or almost equal) to total journey by other drivers as a whole.

Let's say, there are 30 drivers in total. Then 40 journeys by A and 40 journeys by others are taken (i.e., approximately 2 journeys by each of remaining driver making total of 29×2=58 journey by others). Then these journeys are compared to obtain relevancy of all the features. The results are stored in "Feature Relevance Table" below (also referred as Table 1) as illustrative examples:

TABLE 1

| Feature | D001 | D002 | D003 | ... |
|---|---|---|---|---|
| Max_Neg_Lon_Accel | 11.12086 | 5.462323 | 3.120555 | ... |
| Percentile97p7_Neg_Lon_Accel | 10.68922 | 0 | 0 | ... |
| Third_Quartile_Speed | 0 | 4.232789 | 6.371073 | ... |

It is depicted from above Table 1, that each row denotes values of a feature. 1st column stores the name of a feature. Rest row stores relevancy of the feature for each driver. At this step the most relevant features for each driver are obtained. Now all the rejected features (i.e., feature not important for a particular driver) have (or may have) 0 value in the respective position. Like in above table "Third_Quartile_Speed" may not important for driver D001.

For a driver when minimum 30 journeys are completed this computation takes place. For each drive the above Table 1 is updated. After that the system 100 goes in active mode for that specific driver. From next trip onwards authenticity of that driver is checked, and the process for each of the drivers may be operated in parallel.

Below Table 2 depicts one or more relevant/important features for specific drivers to determine an identity of drivers or authenticate drivers along with rank for each of the features, and importance value of each features.

TABLE 2

| Features | Importance/Relevance | Rank |
|---|---|---|
| First_Quartile_Lat_Acceleration | 7.381773227 | 1 |
| Median_Pos_Lat_Accel | 6.479857402 | 2 |
| First_Quartile_Jerk_Lat | 6.117649043 | 3 |
| Third_Quartile_Neg_Lon_Accel | 6.048083685 | 4 |
| Third_Quartile_Course_Diff_Diff | 5.803257566 | 5 |
| First_Quartile_Lat_Acceleration_Diff | 5.727210407 | 6 |
| Inter_Quartile_Range_Course_Diff | 5.717650871 | 7 |
| Percentile2p3_Speed | 5.556365559 | 8 |
| Inter_Quartile_Range_Lat_Acceleration | 5.351124534 | 9 |
| Percentile97p7_Neg_Lon_Accel | 5.188164048 | 10 |
| ... | ... | ... |
| Third_Quartile_Course_Diff | 2.570830768 | 38 |

In an embodiment of the present disclosure, at step 208, the one or more hardware processors 104, perform a second comparison of (i) a value of each ranked feature from the one or more features (from above Table 2) and (ii) a value of corresponding feature pertaining to the one or more driving patterns stored in the database 108. In an embodiment, the expression 'second comparison' refers to 'a first time comparison', and the literal meaning of the expression 'second comparison' shall not be construed as a comparison being performed for a second time. In other words, at step 208, the one or more hardware processors 104, perform a comparison of a value of each ranked feature from the one or more features (from above Table 2) and a value of corresponding feature pertaining to the one or more driving patterns stored in the database 108.

In an embodiment of the present disclosure, at step 210, the one or more hardware processors 104 generate an abnormality score for each of the relevant feature based on the second comparison. 1. The database 108 comprises all the features (more than relevant) for driver A. A Feature counter (FC) takes the relevant feature list for Feature relevance table. Let the number of relevant features for this driver=N. Only these features are important for driver in consideration.

Then FC takes each feature, and queries for each feature using the driver ID and past 30 values of this feature are obtained from the database 108. The system 100 performs clustering find in which cluster the current value falls. Then all past values of this feature in identified cluster and the current value is taken together. After that a probability score may be obtained/computed (based on empirical cumulative distribution function) for "the current feature value", let this score be denoted by $X_f$. Clearly $X_f$ is a non-negative number less than equal 1.

The system 100 may define abnormality score as below expression illustrated by way of example:

$$AB(X_f)=2*absolute(X_f-0.5) \quad (1)$$

Once this step completes, the system 100 has abnormality score computed for each of the relevant feature. Relevancy score was already computed and available is "Feature Relevancy Table" (Table 2). Below Table 3 depicts abnormality score for each relevant feature illustrated by way of examples:

TABLE 3

| Features | Importance/Relevance | Abnormality Score |
|---|---|---|
| Third_Quartile_Neg_Lon_Accel | 11.12086 | 0.089156 |
| Percentile97p7_Neg_Lon_Accel | 10.68922 | 0.481428 |
| First_Quartile_Jerk_Lat | 6.822626 | 0.249721 |
| Third_Quartile_Lat_Acceleration_Diff | 6.792401 | 0.801899 |
| Inter_Quartile_Range_Course_Diff_Diff | 6.685872 | 0.818125 |
| First_Quartile_Pos_Lat_Accel | 6.463841 | 0.967173 |
| Inter_Quartile_Range_Lat_Acceleration_Diff | 6.41722 | 0.902586 |
| Mode_Speed | 6.386032 | 0.198148 |
| Third_Quartile_Course_Diff_Diff | 6.371073 | 0.489607 |
| First_Quartile_Course_Diff_Diif | 5.725383 | 0.936542 |

In an embodiment of the present disclosure, at step 212, the one or more hardware processors 104 authenticate the driver based on the abnormality score. In an embodiment, the driver is authenticated based on the abnormality score by performing a third comparison of the abnormality score with a first pre-defined threshold. In an embodiment, the expression 'third comparison' refers to 'a first time comparison', and the literal meaning of the expression 'third comparison' shall not be construed as a comparison being performed for a third time. In other words, the driver is authenticated based on the abnormality score by performing a comparison of the abnormality score with a first pre-defined threshold. For example, the driver may be (or is) authenticated when the abnormality score (of each of the relevant and ranked feature) matches a corresponding first pre-defined threshold of that particularly feature. In another example, the driver may be (or is) authenticated when the abnormality score is in close proximity of the corresponding pre-defined threshold for that particularly feature. The value of threshold of the close proximity may be user configurable/user defined, in an example embodiment.

Below is an example of a feature for which an abnormality score is computed.

Let's say a feature "Max_speed" (i.e. maximum speed for a journey) is 17.75 [current value].

Now from previous journey 30 values of Max_speed are obtained. Analysis using standard clustering gives that 17.75 belongs to a cluster with cluster mean 18.19. Now empirical CDF calculated from all prior data value is used to obtain eCDF value for 17.75. H (17.75)=0.41. This gives abnormality score=2×absolute (0.41−0.5)=0.18.

In an embodiment of the present disclosure, when the abnormality score (of each of the relevant features or at least a subset of the relevant features) does not match the first pre-defined threshold, the one or more hardware processors 104 generate an average abnormality score based on the abnormality score for each of the relevant feature, and then the system 100 authenticate the driver based on the average abnormality score. In an embodiment of the present disclosure, the system 100 may intelligently select the computation of average abnormality score for each feature when the system 100 determines that abnormality score all of the features or a subset of the features do not match the first pre-defined threshold. This intelligent computation of average abnormality score for each feature is based on driving pattern(s) of drivers, and learning pattern of the system 100 during the authentication process. In an embodiment, the step of authenticating the driver based on the average abnormality score comprises performing a fourth comparison of the average abnormality score and a second pre-defined threshold; and authenticating the driver based on the fourth comparison. In an embodiment, the expression 'fourth comparison' refers to 'a first time comparison', and the literal meaning of the expression 'fourth comparison' shall not be construed as a comparison being performed for a fourth time. In an embodiment, the step of authenticating the driver based on the average abnormality score comprises performing a comparison of the average abnormality score and the second pre-defined threshold. In an embodiment, value associated with each of the first pre-defined threshold and the second pre-defined threshold are identical. In another embodiment, value associated with each of the first pre-defined threshold and the second pre-defined threshold are different from each other. In an embodiment of the present disclosure, the abnormality score and/or the average abnormality score may be computed using a score generation module stored in the one or more modules 110 residing in the memory 102. Further, the first comparison, the second comparison, third comparison and the fourth comparison may be performed by a comparison module stored in the one or more modules 110 residing in the memory 102.

Below illustrated is computation of average abnormality score for drivers' authentication by way of example:

Let total number of features for which abnormality score is ≥0.9=P.

Previously in above number of relevant features for a specific driver is calculated as N.

IF (P/N >=T1), where T1 is configurable (and a variable); currently T1 = 0.5
    THEN: output = FALSE
ELSE:
    THEN: Compute average abnormality score.
END Average Abnormality Score Computation:

Average abnormality score is computed as weighted average of abnormality score with relevancy level as weight. Let for feature I (or 1) relevancy is $w_i$ and abnormality score is $ab_i$.

$$\text{Then average abnormality score } (AAS) = \frac{\sum_{i=1}^{N} w_i ab_i}{\sum_{i=1}^{N} w_i} \quad (2)$$

For mentioned table average abnormality score is 0.551872

After this step computed value for AAS is obtained. Now,

IF AAS > T2, where T2 is configurable (and a variable); currently T2 = 0.75
    THEN: Output = FALSE // (i.e. Then driver Identity is FALSE)
ELSE
    THEN: Output = TRUE // Driver identity is TRUE TRUE/FALSE flag are obtained from above expressions (or equation(s)) to indicate status of driver identity. After authentication is done, current feature values are updated in the database 108. Next time this is treated as a past entry which makes this system 100 agile, robust and adaptive with time. Upon the driver being authenticated based on the abnormality score or the average abnormality score, a driver profile for the authenticated driver is updated in the database 108. In an embodiment, the drive profile of the authenticated driver is updated using a profile updation module stored in the one or more modules 110 residing in the memory 102.

Below illustrated is a table depicting authentication accuracy by the system 100, by way of example:

TABLE 3

| Driver ID | Sensitivity correct selection | Specificity correct rejection | Accuracy |
|---|---|---|---|
| D001 | 0.73 | 0.74 | 73.43 |
| D002 | 0.7 | 0.8 | 75 |
| D003 | 0.81 | 0.89 | 85.33 |

The feature extraction module, the ranking technique, the ranking module, the comparison module, the score generation module, and the profile updation module are implemented as at least one of a logically self-contained part of a software program, a self-contained hardware component, and/or, a self-contained hardware component with a logically self-contained part of a software program embedded into each of the hardware component that when executed perform the above method described herein. In an embodiment, the database 108 comprises information pertaining to drivers, driver profiles (or updated driver profiles), extracted features from trip information, primary data and secondary derived data of each trip information pertaining to each driver, comparison data (e.g., the first comparison data, the second comparison data, the third comparison data, the fourth comparison data, etc.), the first pre-defined threshold, the second pre-defined threshold, the abnormality score for each of the ranked/relevant feature, the average abnormality score, and authentication details, authentication denials, driving pattern(s) of driver(s), data pertaining to learning behavior(s) of the system 100, and the like. This enables the system 100 to learn from the past or historical data to improvise, correctly determine identity of drivers, and accurately authenticate them (driver identifier, for example— driver(s)/or drivers' name and vehicle(s)/or vehicle identifier(s)) accordingly, thus making the system 100 more efficient.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYS, flash drives, disks, and any other known physical storage media.

It is intended that the disclosure and examples be considered as exemplary only, with a true scope and spirit of disclosed embodiments being indicated by the following claims.

What is claimed is:
1. A processor implemented method, comprising:
obtaining, from a Global Positioning System (GPS), GPS data comprising trip information pertaining to a vehicle being driven by a driver;
extracting one or more features from the trip information;
ranking the one or more features from the trip information by performing a first comparison of the one or more features with a plurality of features associated with a plurality of trip information pertaining to other drivers to selectively identify and obtain one or more ranked features, wherein the one or more ranked features are selectively identified based on the trip information and historical data pertaining to one or more driving patterns of the driver stored in a database, and wherein the one or more ranked features are associated with a corresponding importance value;
performing a second comparison of (i) the importance value of each ranked feature from the one or more ranked features and (ii) a value of corresponding feature pertaining to the one or more driving patterns stored in the database;
generating an abnormality score for each of the ranked feature based on the second comparison; and
authenticating the driver based on the abnormality score.
2. The processor implemented method of claim 1, wherein the step of authenticating the driver based on the abnormality score comprises:

performing a third comparison of the abnormality score with a first pre-defined threshold; and authenticating the driver based on the third comparison.

3. The processor implemented method of claim 2, wherein when the abnormality score does not match the first pre-defined threshold, the method comprises:

generating an average abnormality score based on the abnormality score for each of the relevant feature; and authenticating the driver based on the average abnormality score.

4. The processor implemented method of claim 3, wherein the step of authenticating the driver based on the average abnormality score comprises:

performing a fourth comparison of the average abnormality score and a second pre-defined threshold; and authenticating the driver based on the fourth comparison.

5. The processor implemented method of claim 3, further comprising upon the driver being authenticated based on the abnormality score or the average abnormality score, updating a driver profile for the driver in the database.

6. The processor implemented method of claim 1, wherein the step of extracting the one or more features from the trip information comprises:

obtaining a primary data from the trip information, and deriving a secondary data from the primary data; and extracting the one or more features from the primary data and the secondary data.

7. A system, comprising:

a memory storing instructions, and a database comprising one or more driving patterns and one or more driver profiles;

one or more communication interfaces; and one or more hardware processors coupled to the memory via the one or more communication interfaces, wherein the one or more hardware processors are configured by the instructions to:

obtain, from a Global Positioning System (GPS), GPS data comprising trip information pertaining to a vehicle being driven by a driver;

extract one or more features from the trip information;

rank the one or more features from the trip information by performing a first comparison of the one or more features with a plurality of features associated with a plurality of trip information pertaining to other drivers to selectively identify and obtain one or more ranked features, wherein the one or more ranked features are selectively identified based on the trip information and historical data pertaining to one or more driving patterns of the driver stored in the database, and wherein the one or more ranked features are associated with a corresponding importance value;

perform a second comparison of the importance value of each of the ranked feature from the one or more ranked features and a value of corresponding feature pertaining to the one or more driving patterns stored in the database;

generate an abnormality score for each of the ranked feature based on the second comparison; and authenticate the driver based on the abnormality score.

8. The system of claim 7, wherein the driver is authenticated based on the abnormality score by:

performing a third comparison of the abnormality score with a first pre-defined threshold; and authenticating the driver based on the third comparison.

9. The system of claim 8, wherein when the abnormality score does not match the first pre-defined threshold, the one or more hardware processors are further configured by the instructions to:

generate an average abnormality score based on the abnormality score for each of the relevant feature; and authenticate the driver based on the average abnormality score.

10. The system of claim 9, wherein the driver is authenticated based on the average abnormality score by:

performing a fourth comparison of the average abnormality score and a second pre-defined threshold; and authenticating the driver based on the fourth comparison.

11. The system of claim 9, upon the driver being authenticated based on the abnormality score or the average abnormality score, the one or more hardware processors are further configured by the instructions to update a driver profile of the driver in the database.

12. The system of claim 7, wherein the one or more features are extracted from the trip information by:

obtaining a primary data from the trip information, and deriving a secondary data from the primary data; and extracting the one or more features from the primary data and the second data.

13. One or more non-transitory machine readable information storage mediums comprising one or more instructions which when executed by one or more hardware processors causes:

obtaining, from a Global Positioning System (GPS), GPS data comprising trip information pertaining to a vehicle being driven by a driver;

extracting one or more features from the trip information;

ranking the one or more features from the trip information by performing a first comparison of the one or more features with a plurality of features associated with a plurality of trip information pertaining to other drivers to selectively identify and obtain one or more ranked features, wherein the one or more ranked features are selectively identified based on the trip information and historical data pertaining to one or more driving patterns of the driver stored in a database, and wherein the one or more ranked features are associated with a corresponding importance value;

performing a second comparison of (i) the importance value of each ranked feature from the one or more ranked features and (ii) a value of corresponding feature pertaining to the one or more driving patterns stored in the database;

generating an abnormality score for each of the ranked feature based on the second comparison; and authenticating the driver based on the abnormality score.

14. The one or more non-transitory machine readable information storage mediums of claim 13, wherein the step of authenticating the driver based on the abnormality score comprises:

performing a third comparison of the abnormality score with a first pre-defined threshold; and authenticating the driver based on the third comparison.

15. The one or more non-transitory machine readable information storage mediums of claim 14, wherein when the abnormality score does not match the first pre-defined threshold, the method comprises:

generating an average abnormality score based on the abnormality score for each of the relevant feature; and authenticating the driver based on the average abnormality score.

16. The one or more non-transitory machine readable information storage mediums of claim 15, wherein the step of authenticating the driver based on the average abnormality score comprises:
performing a fourth comparison of the average abnormality score and a second pre-defined threshold; and
authenticating the driver based on the fourth comparison.

17. The one or more non-transitory machine readable information storage mediums of claim 15, wherein the one or more instructions which when executed by the one or more hardware processors further causes: upon the driver being authenticated based on the abnormality score or the average abnormality score, updating a driver profile for the driver in the database.

18. The one or more non-transitory machine readable information storage mediums of claim 13, wherein the step of extracting the one or more features from the trip information comprises:
obtaining a primary data from the trip information, and deriving a secondary data from the primary data; and
extracting the one or more features from the primary data and the secondary data.

\* \* \* \* \*